United States Patent
Fujii et al.

(10) Patent No.: US 6,785,455 B2
(45) Date of Patent: Aug. 31, 2004

(54) DISPERSION COMPENSATION UNIT AND METHOD OF PRODUCING THE SAME

(75) Inventors: Takashi Fujii, Yokohama (JP); Toshifumi Hosoya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 167 days.

(21) Appl. No.: 10/221,345

(22) PCT Filed: Jan. 21, 2002

(86) PCT No.: PCT/JP02/00376

§ 371 (c)(1),
(2), (4) Date: Sep. 11, 2002

(87) PCT Pub. No.: WO02/059659

PCT Pub. Date: Aug. 1, 2002

(65) Prior Publication Data

US 2003/0053777 A1 Mar. 20, 2003

(30) Foreign Application Priority Data

Jan. 23, 2001 (JP) ........................ 2000-014751

(51) Int. Cl.$^7$ ................................. G02B 6/02
(52) U.S. Cl. ............... 385/123; 385/5; 385/12; 385/10; 264/1.28; 264/456; 264/271.1
(58) Field of Search ............. 385/123, 12, 5, 385/10, 37; 264/1.28, 456, 271.1

(56) References Cited

U.S. PATENT DOCUMENTS

| 5,444,534 A | | 8/1995 | Dyott et al. | |
| 5,481,358 A | * | 1/1996 | Dyott et al. | 356/465 |
| 6,226,438 B1 | * | 5/2001 | Bylander et al. | 385/136 |

FOREIGN PATENT DOCUMENTS

| EP | 1 063 542 A1 | 12/2000 |
| EP | 1 132 759 A1 | 9/2001 |
| EP | 1 152 266 A1 | 11/2001 |
| JP | 10-123342 | 5/1998 |
| JP | 2001-154032 | 6/2001 |
| WO | WO00/28356 | 5/2000 |
| WO | WO00/41011 | 7/2000 |

OTHER PUBLICATIONS

U.S. patent application Ser. No. 09/240,690, Koyano et al., filed Feb. 2, 1999.
U.S. patent application Ser. No. 09/477,561, Koyano et al., filed Jan. 4, 2000.
U.S. patent application Ser. No. 09/831,308, Fujii et al., filed May 8, 2001.

* cited by examiner

Primary Examiner—Frank G. Font
Assistant Examiner—Kevin C Kianni
(74) Attorney, Agent, or Firm—McDermott Will & Emery LLP

(57) ABSTRACT

A dispersion compensating fiber 1 is placed in the form of a coil or bundle within a housing 2, and a filling material 3 having a viscosity of 0.01 Pa·s to 0.6 Pa·s at normal temperature before curing is filled in a space around the dispersion compensating fiber 1 within the housing 2 and then the filling material is cured. As a result, a change of transmission loss caused by a temperature variation due to heat cycles of the dispersion compensator can be reduced. A difference in transmission loss can be further reduced by employing a method of placing the dispersion compensating fiber in the housing in the form of a loosely wound bundle and then pouring the filling material, or a method of applying vibration to the housing, in which the dispersion compensating fiber is placed, when pouring the filling material.

14 Claims, 4 Drawing Sheets

DISPERSION COMPENSATION UNIT AND METHOD OF PRODUCING THE SAME

TECHNICAL FIELD

The present invention relates to a dispersion compensator and a method of manufacturing the dispersion compensator, in which a dispersion compensating fiber is placed in the form of a coil or bundle within a housing and a space around the dispersion compensating fiber is filled with a filling material.

BACKGROUND ART

A dispersion compensator for canceling chromatic dispersion at a 1.55 μm band has been developed to perform long-distance, large-capacity optical transmission at a 1.55 μm band using a single-mode optical fiber that has a zero-dispersion wavelength at a 1.3 μm band. International Publication WO00/41011 discloses a dispersion compensator in which a dispersion compensating fiber having negative chromatic dispersion at a 1.55 μm band is wound to form an optical fiber coil, and an outer surface of the optical fiber coil is surrounded by a resin for maintaining the shape of optical fiber coil.

FIG. 6 is a cross-sectional view showing one example of a dispersion compensator disclosed in International Laid-Open Publication WO 00/41011. Numeral 32 denotes an optical fiber coil, 80 denotes a container, 82 denotes a container lid, and 84 denotes a filling material. The above-cited Publication states that the filling material 84 can be formed of, e.g., a thermosetting or ultraviolet-curing silicone resin having the Young's modulus of not more than 0.05 kg/mm$^2$ or a highly-viscous jelly-like admixture, which is obtained by swelling butadiene, silicone or other similar rubber with a solvent, such as silicone or naphthene, and adding another resin, etc. as required.

Japanese Patent Application Publication No. 2001-154032 discloses a dispersion compensator employing a filling material in which a platinum catalyst is added. The above-cited Publication states that an isocyanate compound contained in a secondary coating layer of an optical fiber impedes curing of the filling material in the portion which is in contact with the optical fiber, thereby causing the filling material in that portion to be in the liquid or semi-liquid phase, while the filling material in other portion is cured to serve as an elastic solid member.

DISCLOSURE OF INVENTION

The present invention is concerned with a method of manufacturing a dispersion compensator, the method comprising the steps of placing a dispersion compensating fiber in the form of a coil or bundle within a housing; filling a space around the dispersion compensating fiber within the housing with a filling material having a viscosity of 0.01 Pa·s to 0.6 Pa·s at normal temperature before curing; and then curing the filling material.

By setting the viscosity of the filling material before curing to be in the above-mentioned range, the coil or bundle of the dispersion compensating fiber is entirely and evenly held with the filling material and brought into an immobile condition. Accordingly, since a movement of the fiber due to its own weight is prevented, the micro-bending and external compression between the winding layers of the fiber and between the fiber and the filling material are hardly induced. As a result, an increase of transmission loss can be suppressed and a change of transmission loss caused by a temperature variation due to heat cycles of the dispersion compensator can be reduced. Those advantages of the present invention are valuable because the dispersion compensating fiber is vulnerable to bending and external compression force.

By placing the dispersion compensating fiber in the form of a loosely wound bundle, the filling material, having a viscosity of 0.01 Pa·s to 0.6 Pa·s at the normal temperature before curing, is permeated into the bundle of the dispersion compensating fiber in a manner such that the filling material fills not only the space around the bundle, but also gaps between individual windings of the dispersion compensating fiber. Therefore, the individual windings of the dispersion compensating fiber can be covered with the filling material. Even though some bubbles are left in the gaps between the individual windings of the dispersion compensating fiber, those bubbles will not cause a fatal effect upon the transmission loss. The above-mentioned bundle of the dispersion compensating fiber can be formed by winding the dispersion compensating fiber over a bobbin barrel, withdrawing the bobbin barrel to obtain massive windings of the dispersion compensating fiber in the form of a coil, and deforming the fiber coil into a loosely wound state. As an alternative, the bundle of the dispersion compensating fiber may be formed by dropping the dispersion compensating fiber directly into the housing while a position at which the dispersion compensating fiber drops in the housing is moved so as to draw a circle relative to an upper surface of the housing.

When filling the space around the dispersion compensating fiber in the housing with the filling material, it is possible to fill the gaps between the individual windings of the dispersion compensating fiber with the filling material, and hence to reduce the amount of remaining bubbles, by applying ultrasonic vibration, mechanical vibration or the like to the housing in which the dispersion compensating fiber is placed and the filling material is filled. Therefore, a change of transmission loss caused by a temperature variation due to heat cycles of the dispersion compensator can be further reduced.

By employing the filling material which has a viscosity of the above-mentioned range before curing and in which a platinum catalyst of not less than 100 ppm and a curing restrainer not more than 100 ppm are added, it is made possible to allow the curing restrainer, which hinders curing for several minutes or several hours, to cause the filling material to permeate into the coil or bundle of the dispersion compensating fiber so as to more completely fill the gaps between the individual windings of the dispersion compensating fiber, and moreover to allow the platinum catalyst to cure the filling material that has been filled in the gaps between the individual windings of the dispersion compensating fiber.

By employing the filling material whose viscosity is in the above-mentioned range before curing and whose contact angle measured 30 seconds after the dripping thereof is larger than 0 degree and not more than 12 degrees with respect to a sheet made of the same coating material as that used for the outermost layer of the dispersion compensating fiber, it is ensured that the filling material permeates into the coil or bundle of the dispersion compensating fiber so as to reach a space around each winding of the dispersion compensating fiber and to fill the gaps between the individual windings of the dispersion compensating fiber. Then the transmission loss of the dispersion compensating fiber on the long-wavelength side can be suppressed. One method for adjusting the contact angle of the filling material within the above-mentioned range is to add a surfactant into the filling material. When the contact angle of the filling material after 30 seconds from its dripping is a relatively large value within the above-mentioned range, some bubbles may remain in the space around the dispersion compensating fiber, but those bubbles will not fatally affect the transmission loss of the dispersion compensating fiber. From the viewpoint of keeping the transmission loss as small as possible, the contact angle of the filling material after 30 seconds from the dripping thereof is preferably not more than 8 degrees.

By employing the filling material that has a viscosity in the above-mentioned range before curing and has a cone penetration of not less than 5 and not more than 200 in the range of not lower than −20° C. and not higher than 70° C. when a ¼ cone is used in conformity with the standard of JIS K 2220, the coil or bundle of the dispersion compensating fiber can be held stably for a long term, and excessive stresses on the optical fiber are avoided even when the fiber is subjected to a temperature variation caused by changes in the environment. Accordingly, the small transmission loss of the dispersion compensating fiber on the long-wavelength side can be stably maintained for a long term. If the cone penetration of the filling material is smaller than the above-mentioned range, the loss would be increased at low temperatures during heat cycles. If the cone penetration of the filling material is larger than the above-mentioned range, holding of the coil or bundle of the dispersion compensating fiber would be insufficient, thus resulting in a concern that the loss would increase upon impacts applied. Preferably, the filling material has a cone penetration of not less than 5 and not more than 200 at 25° C. when a ¼ cone is used.

Further, the present invention is concerned with a dispersion compensator, the dispersion compensator comprising a dispersion compensating fiber in the form of a coil or bundle, a housing, and a filling material, wherein the dispersion compensating fiber is placed in the housing, and a space around the dispersion compensating fiber is filled with the filling material, the filling material having a viscosity of 0.01 Pa·s to 0.6 Pa·s at normal temperature before curing.

The filling material used in the above dispersion compensator preferably contains a platinum catalyst of not less than 100 ppm and a curing restrainer of not more than 100 ppm.

In the above dispersion compensator, preferably, the filling material has a contact angle of larger than 0 degrees and not larger than 12 degrees after 30 seconds from the dripping thereof with respect to a sheet made of the same coating material as that used for an outermost layer of the dispersion compensating fiber. A surfactant may be added in the filling material.

In the above dispersion compensator, preferably, the filling material has a cone penetration of not less than 5 and not more than 200 at a temperature in the range of not lower than −20° C. and not higher than 70° C. when a ¼ cone is used according to the standard of JIS K 2220. More preferably, the filling material has a cone penetration of not less than 5 and not more than 200 at 25° C. when a ¼ cone is used.

BRIEF DESCRIPTION OF DRAWINGS

FIG. 1 shows an example of a dispersion compensator produced by a manufacturing method according to the present invention, in which

BEST MODE FOR CARRYING OUT THE INVENTION

Figure 1A:
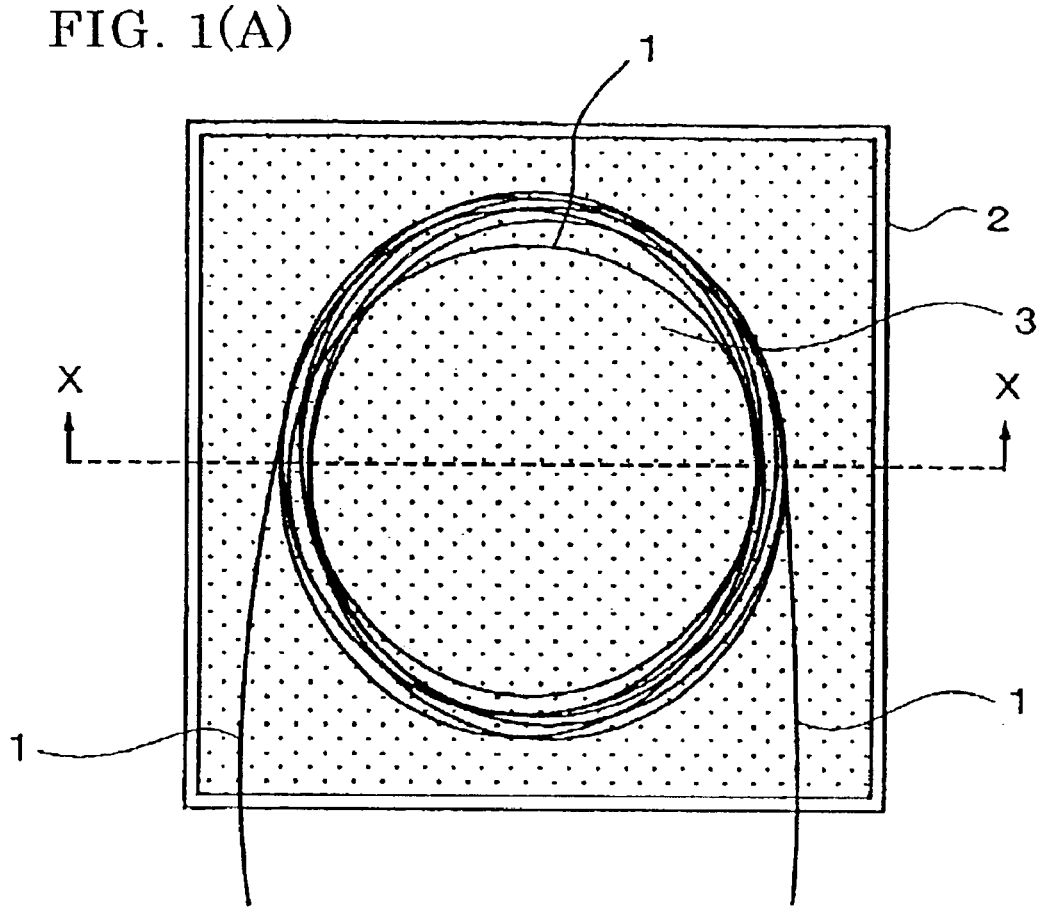
FIG. 1(A) is a plan view of an internal construction and FIG. 1(B) is a sectional view taken along a line X.
Figure 1B:
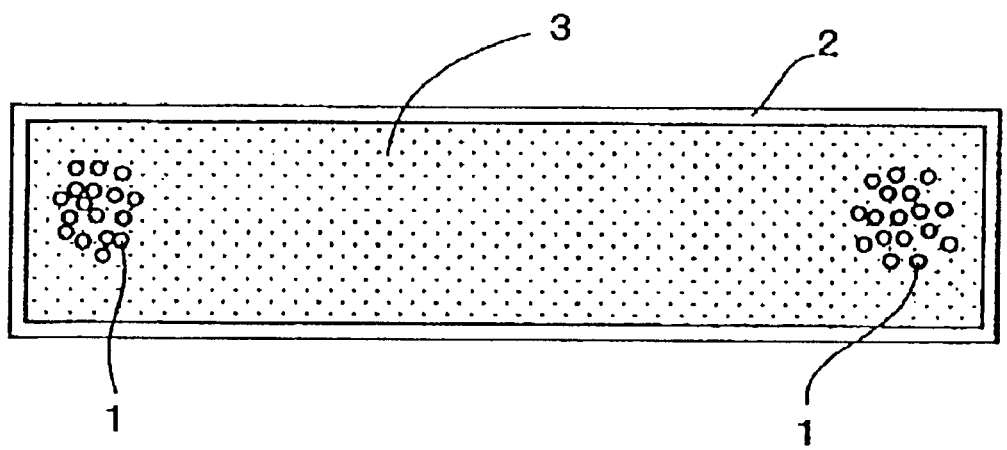

Referring to FIG. 1, numeral 1 denotes a dispersion compensating fiber, 2 denotes a housing, and 3 denotes a filling material. The illustrated dispersion compensator is manufactured by placing the dispersion compensating fiber 1 in the form of a coil or bundle within the housing 2, filling the filling material 3 in a space around the dispersion compensating fiber 1 within the housing 2, and then curing the filling material 3. A resin having a viscosity of 0.01 Pa·s to 0.6 Pa·s at normal temperature before curing is employed as the filling material. A gel-like silicone resin produced by an addition reaction of polysiloxane containing SiH and polysiloxane containing a vinyl group can be obtained with viscosity in the above-mentioned range, and hence can be used as the filling material. Note that the viscosity of the filling material before curing can be changed by adjusting the molecular weight of polysiloxane.

In the dispersion compensator thus manufactured, since the space around the coil or bundle of the dispersion compensating fiber is filled with the filling material made of a low-viscous resin having a viscosity of not more than 0.6 Pa·s at normal temperature before curing so that the dispersion compensating fiber is held by the filling material, only uniform and small stresses are imposed on the coil or bundle of the dispersion compensating fiber from the filling material. As a result, a change of transmission loss caused by a temperature variation due to heat cycles of the dispersion compensator can be reduced. It is undesirable to use a filling material whose viscosity before curing is less than 0.01 Pa·s, because the time required for curing of the resin would be prolonged.

A long dispersion compensating fiber 1 having a length of not less than 500 m is wound over a bobbin with a barrel diameter of about 120 mm, and thereafter a bobbin barrel is withdrawn to obtain massive windings of the dispersion compensating fiber 1 in the form of a coil. Then, the regularly wound state of the dispersion compensating fiber is deformed and untied into a loosely wound bundle by applying vibration to the coil or twisting it with both hands. The bundle of the dispersion compensating fiber is placed in the housing, and the space around the dispersion compensating fiber is filled with the filling material made of a low-viscous resin having a viscosity of not more than 0.6 Pa·s at normal temperature before curing. With those steps, the filling material is filled into even gaps between windings of the dispersion compensating fiber so that the individual windings of the dispersion compensating fiber are covered individually with the filling material. Therefore, only uniform stresses are imposed on the dispersion compensating fiber from the filling material even when subjected to heat cycles, and a change of transmission loss can be reduced.

Figure 2:
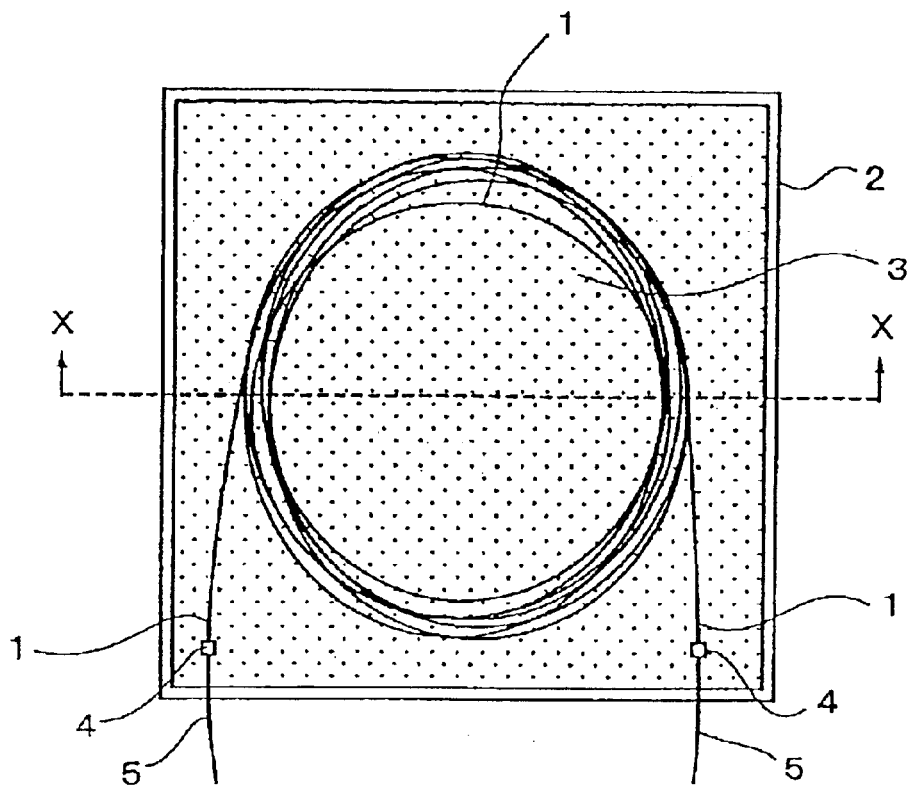
FIG. 2 is a plan view showing an internal construction of another example of the dispersion compensator.

Alternatively, as shown in FIG. 2, in the stage of manufacturing the dispersion compensator, fusion splicing portions 4 may be provided at opposite ends of the dispersion compensating fiber 1 and single-mode type optical fibers 5 may be connected to the fusion splicing portions 4. With such an arrangement, in the case where the dispersion compensator is disposed at a midway of an optical transmission line and single-mode type optical fibers constituting the optical transmission line are connected to the dispersion compensator, the connecting work can be more easily performed because the connection is established between the single-mode type optical fibers.

When the filling material is caused to permeate into the coil or bundle of the dispersion compensating fiber so that the individual windings of the dispersion compensating fiber are covered with the filling material, curing of such filling material may be impeded by an isocyanate compound contained in a coating of the dispersion compensating fiber and in some cases the filling material may not be cured sufficiently. Particularly, in the case where the coil of the dispersion compensating fiber is placed in the housing and the filling material is filled in the housing while the interior of the housing is depressurized, causing the filling material to permeate into the coil by repeating the steps of pressurizing and depressurizing the interior of the housing may allow the filling material having permeated therein to remain uncured in some cases. To prevent such a drawback, a platinum catalyst serving as a curing reaction catalyst for the filling material may be added in the filling material such that the added content is not less than 100 ppm. Preferably, the platinum catalyst is added in an amount of not less than 200 ppm. A sufficient level of the amount of the platinum catalyst is 1000 ppm. On the other hand, as the added mount of the platinum catalyst increases, curing of the filling material is expedited and it is likely that the filling material is cured before the filling material fully permeates into the spaces around the individual windings of the dispersion compensating fiber. This may allow the gaps between the windings of the dispersion compensating fiber to be only partially filled with the filling material. In view of the above, at the same time as the platinum catalyst of not less than 100 ppm is added, a curing restrainer is also added in the filling material such that the added content thereof is not more, than 100 ppm. Adding the curing restrainer allows the filling material to permeate into the optical fiber coil, ensuring that the gaps between the windings of the dispersion compensating fiber are completely filled within a given time. Preferably, the curing restrainer is added in an amount of not less than 1 ppm. Thus, by adding the platinum catalyst in an amount of not less than 100 ppm and the curing restrainer in an amount of not more than 100 ppm in the filling material at the same time, the filling material can be cured in a condition in which the gaps between the windings of the dispersion compensating fiber are completely filled with the filling material. As a result, long-term reliability can be improved. More specifically, a loss increase caused by impacts in a long-term use can be suppressed.

Figure 3:
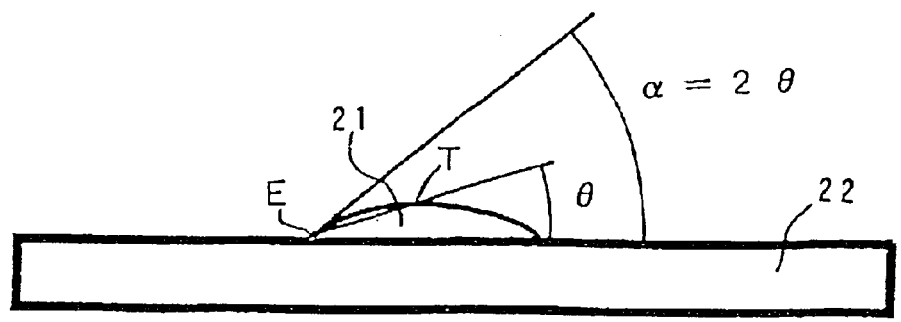
FIG. 3 is a representation showing a manner for determining a contact angle.

A contact angle of the filling material after 30 seconds from the dripping thereof with respect to a sheet made of the same coating material as that used for the outermost layer of the optical fiber is measured as follows. The liquid filling material before curing is dripped onto the sheet to form a droplet with a diameter of 4 mm to 6 mm. Then, the liquid droplet after 30 seconds from the dripping thereof is measured using a commercially available contact angle meter (e.g., FACE CA-D made by Kyowa Kaimen Kagaku Co., Ltd.). As shown in FIG. 3, a contact angle α is determined as twice an angle θ formed by a line connecting an apex T of a droplet 21 of the filling material and a contact point E with respect to a sheet 22.

The sheet made of the same coating resin as that used for the outermost layer of the optical fiber can be prepared as follows.

A plate of quartz glass is immersed in sulfuric acid for 5 minutes or longer to clean the plate surface. The above-mentioned coating resin is coated on the cleaned plate of quartz glass and then cured by irradiation of ultraviolet rays, thereby forming a 50 mm×50 mm sheet with a thickness of 100 μm. The intensity of the irradiated ultraviolet rays is preferably set to 100 mJ/cm$^2$.

The contact angle of the filling material with respect to the sheet can be adjusted, for example, by adding a surfactant to the filling material. Examples of the surfactant usable for that purpose include dodecyl benzene sodium sulfonate, alkylnaphthalene sodium sulfonate, dioctyl sodium sulfosuccinate, paraffin oxidized alcohol ethylene oxide adduct, oxoalcohol ethylene oxide adduct, Ziegler alcohol adduct, nonlyphenol ethylene oxide adduct, alkylphenol ethylene oxide adduct, higher alcohol ethylene oxide adduct, lauryl sulfuric ester sodium, tridecyl sulfuric ester sodium, tridecyl alcohol ethylene oxide 9.6-mol adduct, octanol ethylene oxide adduct, alkylbenzene sodium sulfonate, alkyldiphenyl ether sodium disulfonate, polyoxyethylene alkylphenyl ether sulfuric ester sodium, saturated fatty acid soap, isotridecyl alcohol ethylene oxide adduct, polyether denatured silicone, and higher fatty acid sorbitan ester.

FIG. 4 shows one example of a dispersion compensating fiber used in manufacturing the dispersion compensator of the present invention. In FIG. 4, numeral 11 denotes a glass fiber, 11a denotes a core portion, 11b denotes a depressed clad portion, tic denotes an outer clad portion, 12 denotes a coating, 12a denotes an inner layer coating, and 12b denotes an outer layer coating.

Figure 4A:
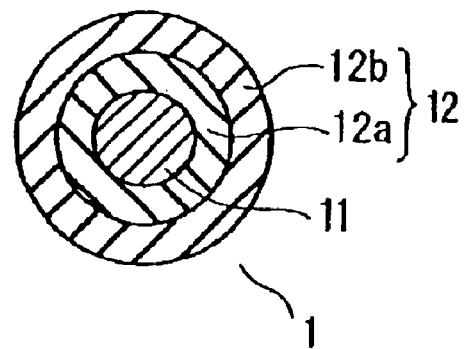
FIG. 4(A) is a cross-sectional view showing an example of a dispersion compensating fiber used in the dispersion compensator of the present invention.

As shown in FIG. 4(A), the dispersion compensating fiber 1 is manufactured by forming the coating 12 on the glass fiber 11. The coating 12 is made up of the inner layer coating 12a and the outer layer coating 12b. An additional layer may be further formed, as required, on the outer side of the outer layer coating 12b. Also, the inner layer coating 12a and the outer layer coating 12b may each be formed of an ultraviolet curing resin such as an urethane acrylate resin. The inner layer coating 12a is formed of a resin having a relatively low Young's modulus, and the outer layer coating 12b is formed of a resin having a relatively high Young's modulus. For example, the Young's modulus of the inner layer coating 12a is set to 1 MPa, and the Young's modulus of the outer layer coating 12b is set to 1000 MPa.

Figure 4B:
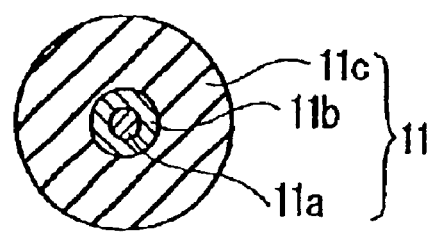
FIG. 4(B) is a cross-sectional view showing an example of a glass fiber used in the dispersion compensating fiber.
Figure 4C:
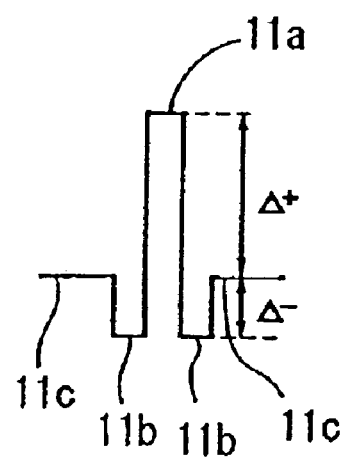
FIG. 4(C) shows a distribution of refractive index in the radial direction of the glass fiber.

Further, as shown in FIGS. 4(B) and 4(C), the glass fiber 11 positioned at the center of the dispersion compensating fiber is made up of, by way of example, the core portion 11a positioned at the center and having a refractive index higher than that of silica glass by Δ+, the depressed clad portion 11b surrounding the core portion 11a and having a refractive index lower than that of silica glass by Δ−, and the outer clad portion 11c surrounding the depressed clad portion 11b and having the same refractive index as that of silica glass. While the glass fiber having the double clad structure has been described above as one example, any other type of glass fiber can be used provided that it has the dispersion compensating function. A glass fiber generally called the segment type and a glass fiber having the triple clad structure are also usable. The triple clad structure is designed, for example, such that an intermediate clad has a higher refractive index than those of inner and outer clads. Further, the present invention is applicable to the case in which the dispersion compensating function is provided by using a glass fiber adapted for the propagation of higher-order modes in the wavelength range of 1.3 μm to 1.7 μm.

EXAMPLE 1

The dispersion compensators such as shown in FIG. 1 were fabricated with dispersion compensating fibers such as shown in FIG. 4, in which the viscosity before curing of a silicone resin used as the filling material was variously changed. For filling the filling material into a housing in which the dispersion compensating fiber and the filling material were put, in one case vibration was applied to the housing, whereas in other cases no vibration was applied to the housing. In each case, a difference in transmission loss during heat cycles was determined as follows. Each fabricated dispersion compensator was put in a thermostat and subjected to heat cycles in which steps of holding −20° C. for 5 hours, holding +70° C. for 5 hours, and lowering temperature to −20° C. were repeated five times. A transmission loss was measured at wavelength of 1.55 μm within one hour before the end of the step of holding each setting temperature for 5 hours. Then, the difference in transmission loss was obtained by subtracting a minimum from a maximum of the measured values. The obtained results are shown in Table I and FIG. 5.

Table II given below shows the dimensions of the various portions of the dispersion compensating fiber used in this Example, Δ+ and Δ− indicating respectively the increase and decrease rates of the refractive index, as well as chromatic dispersion, dispersion slope, and transmission loss in the bundle form at a wavelength of 1.55 μm.

TABLE I

| Case No. | Viscosity before curing (Pa·s) | Difference in transmission loss (dB/km) | Vibration |
| --- | --- | --- | --- |
| 1 | 0.2 | 0.010 | Not applied |
| 2 | 0.5 | 0.012 | Not applied |
| 3 | 0.6 | 0.015 | Not applied |
| 4 | 0.7 | 0.026 | Not applied |
| 5 | 0.8 | 0.045 | Not applied |
| 6 | 1.1 | 0.109 | Not applied |
| 7 | 0.6 | 0.010 | Applied |

Figure 5:
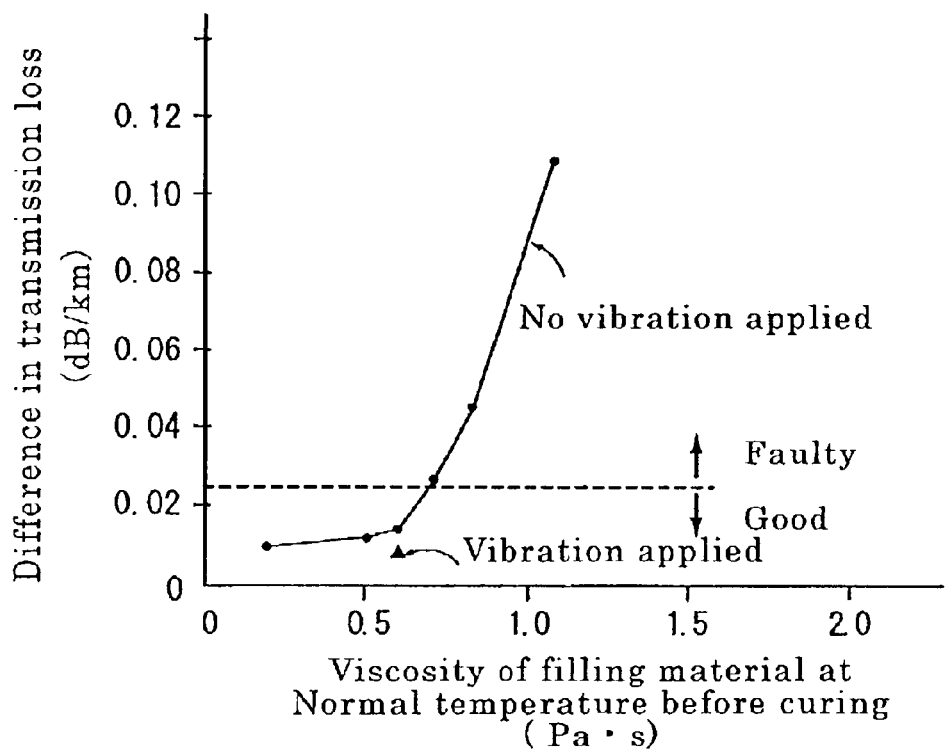
FIG. 5 is a graph showing the relationship between the viscosity of a filling material at normal temperature before curing and a difference in transmission loss during heat cycles of the dispersion compensator in respective cases according to Example 1.
Figure 6:
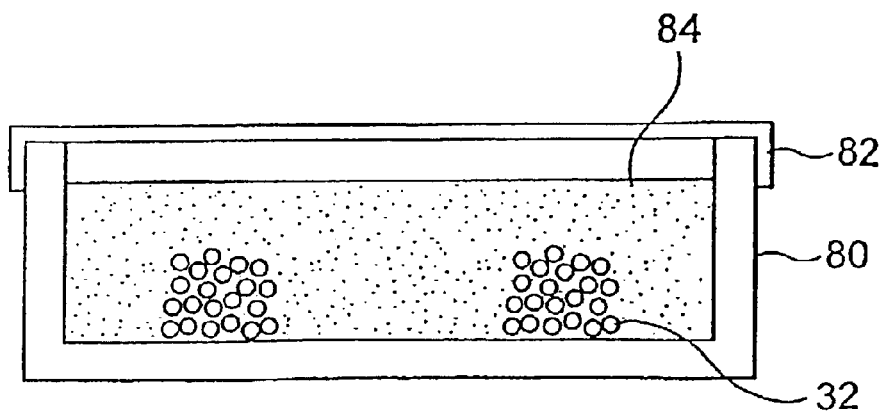
FIG. 6 is a cross-sectional view showing one example of a conventional dispersion compensator.

According to the results shown in Table I and FIG. 5, the difference in transmission loss increases as the viscosity of the filling material before curing increases. When the difference in transmission loss of the dispersion compensator exceeds 0.025 dB/km, that dispersion compensator is judged to be faulty. Of the above-listed cases, the dispersion compensators of the case Nos. 4, 5 and 6 are faulty. Also, as seen from FIG. 5, when the viscosity of the filling material before curing is not more than 0.6 Pa·s at normal temperature, the difference in transmission loss can be held within a good range. Further, a reduction in the difference in transmission loss can be seen in the case of applying vibration to the housing at the time of pouring the filling material as compared with the case of applying no vibration.

TABLE II

| | Example 1 | Example 2 | Example 3 |
| --- | --- | --- | --- |
| Outer diameter of glass fiber (μm) | 120 | 130 | 130 |
| Thickness of inner layer coating (μm) | 20 | 30 | 15 |
| Thickness of outer layer coating (μm) | 20 | 30 | 15 |
| Outer diameter of dispersion compensating fiber (μm) | 200 | 250 | 190 |
| Outer diameter of core portion (μm) | 2.7 | 2.7 | 2.7 |
| Outer diameter of depressed clad portion (μm) | 6.6 | 6.6 | 6.6 |
| Outer diameter of outer clad portion (μm) | 120 | 130 | 130 |
| Δ+ (%) | 1.9 | 1.9 | 1.9 |
| Δ− (%) | −0.4 | −0.4 | −0.4 |
| Chromatic dispersion at wavelength of 1.55 μm (ps/nm/km) | −120 | −120 | −120 |
| Dispersion slope at wavelength of 1.55μ (ps/nm²/km) | −0.28 | −0.28 | −0.28 |
| Transmission loss at wavelength of 1.55 μm (dB/km) | 0.40 | 0.40 | 0.40 |

EXAMPLE 2

A 10-km dispersion compensating fiber having the dimensions and the other parameters, shown in Table II, was wound over a bobbin with a barrel diameter of about 120 mm, and the dispersion compensating fiber was removed from the bobbin to form a coil. The coil of the dispersion compensating fiber was placed in the housing, and 500 ml of a thermosetting filling material having a viscosity of 0.1 Pa·s at normal temperature before curing was poured into the housing while the interior of the housing was depressurized. Then, the filling material was forced to permeate into the coil while repeating the steps of pressurizing and depressurizing the interior of the housing. Then, the filling material was cured at 70° C. for 24 hours. Here, the dispersion compensators were fabricated in a manner in which the amounts of a platinum catalyst and a curing restrainer (acetylene alcohol based curing restrainer) both added to the filling material were variously changed as shown in Table III. An examination of whether the filling material that permeated into the coil of the dispersion compensating fiber was cured was done by breaking up each dispersion compensator. The examined results are shown in Table III.

TABLE III

| Case No. | Amount of platinum catalyst (ppm) | Amount of curing restrainer (ppm) | Condition of Curing |
| --- | --- | --- | --- |
| 8 | 400 | 20 | Cured |
| 9 | 400 | 10 | Cured |
| 10 | 400 | 20 | Cured |
| 11 | 40 | 10 | Not cured |
| 12 | 400 | 120 | Not cured |

According to the results shown in Table III, the filling material that permeated into the coil of the dispersion compensating fiber was cured in case Nos. 8, 9 and 10 in which the platinum catalyst was added in an amount of not less than 100 ppm and the curing restrainer was added in amount of not more than 100 ppm, but the filling material was not cured in the case Nos. 11 and 12 in which the amount of either the added platinum catalyst or the curing restrainer was outside the above-mentioned range.

EXAMPLE 3

Dispersion compensating fibers of 9-km having the dimensions and the other parameters shown in Table II were each wound over a bobbin with a barrel diameter of about 120 mm, and then they were removed from the bobbin to form a coil, respectively. Then, the coil of the dispersion compensating fiber was twisted with both hands such that the fiber coil was deformed from a regularly wound massive state into a loosely wound bundle.

Thereafter, the dispersion compensating fiber in the bundle state was placed in a housing, and a filling material made of a gel-like silicone resin having a viscosity of 0.6 Pa·s before curing was filled in the space around the dispersion compensating fiber within the housing, and the filling material was cured. In this way, two types (case Nos. 13 and 14) of dispersion compensators were fabricated.

The contact angle of the filling material after 30 seconds from the dripping thereof was measured five times, and an average of the measured values was calculated. The compositions of a sheet used in the measurement of the contact angle which was made of the same coating resin as that used for the outermost layer of the dispersion compensating fiber are 60 weight % of polyether type urethane acrylate obtained from polymerization of polytetraethylene glycol, tolylenediisocyanate and hydroxyethyl acrylate and having an average molecular weight of 2000 to 6000, 35 weight % of reactive diluted monomer made up of N-vinylpyrrolidone, ethylene glycol diacrylate and trihydroxyethyl isocyanuric triacrylate, and 5 weight % of ultraviolet polymerization starting agent. In accordance with the method described above, a 50 mm×50 mm sheet with a thickness of 100 $\mu$m was formed by irradiating ultraviolet rays of 100 mJ/cm².

For each dispersion compensator thus fabricated, a transmission loss at a wavelength of 1.55 $\mu$m was examined. The examined results are shown in Table IV.

TABLE IV

| Case No. | Contact angle after 30 seconds from dripping (degree) | Transmission loss (dB) |
| --- | --- | --- |
| 13 | 7.4 | 3.1 |
| 14 | 13.8 | 3.6 |

By maintaining the contact angle at lower than 12 degrees, the transmission loss of light at wavelength of 1.55 $\mu$m corresponding to the long-wavelength side could be suppressed.

Industrial Applicability

According to the present invention, by setting the viscosity of the filling material before curing in the range of not more than 0.01 Pa·s and not less than 0.6 Pa·s, an increase of transmission loss can be suppressed and a change of transmission loss caused by a temperature variation due to heat cycles of the dispersion compensator can be reduced.

In the present invention, by placing the dispersion compensating fiber in the form of a loosely wound bundle, individual windings of the dispersion compensating fiber can be coated one by one with the filling material.

In the present invention, the spaces around the dispersion compensating fiber in the housing is filled with the filling material by applying ultrasonic vibration, mechanical vibration or the like to the housing in which the dispersion compensating fiber is placed and the filling material is filled, whereby a change of transmission loss caused by a temperature variation due to heat cycles of the dispersion compensator can be further reduced.

In the present invention, by employing the filling material in which a platinum catalyst and a curing restrainer are added in an amount of not less than 100 ppm and in an amount of not more than 100 ppm, respectively, it is possible to cure the filling material that has permeated into gaps between the individual windings of the dispersion compensating fiber.

In the present invention, by employing the filling material that has a contact angle of larger than 0 degrees and not larger than 12 degrees after 30 seconds from the dripping thereof with respect to a sheet made of the same coating material as that used for the outermost layer of the dispersion compensating fiber, the transmission loss on the long-wavelength side can be suppressed.

In the present invention, by employing the filling material that has cone penetration of not less than 5 and not more than 200 in a range of not lower than −20° C. and not higher than 70° C. when a ¼ cone is used, the long-term small transmission loss of the dispersion compensating fiber on the long-wavelength side can be stably maintained.

What is claimed is:

1. A method of manufacturing a dispersion compensator, the method comprising the steps of placing a dispersion compensating fiber in the form of a coil or bundle within a housing, and filling a filling material having a viscosity of 0.01 Pa·s to 0.6 Pa·s at normal temperature before curing into a space around said dispersion compensating fiber within said housing and then curing said filling material.

2. A method of manufacturing a dispersion compensator according to claim 1, wherein said dispersion compensating fiber placed in said housing is in the form of a loosely wound bundle.

3. A method of manufacturing a dispersion compensator according to claim 1 or 2, wherein when filling the space around said dispersion compensating fiber with the filling material, vibration is applied to said housing in which said dispersion compensating fiber is placed and the filling material is filled.

4. A method of manufacturing a dispersion compensator according to claim 1, wherein the method employs a filling material in which a platinum catalyst and a curing restrainer are added in an amount of not less than 100 ppm and in an amount of not more than 100 ppm, respectively.

5. A method of manufacturing a dispersion compensator according to claim 4, wherein the method employs a filling material having a contact angle of larger than 0 degrees and not larger than 12 degrees after 30 seconds from its dripping with respect to a sheet made of the same coating material as that used for an outermost layer of said dispersion compensating fiber.

6. A method of manufacturing a dispersion compensator according claims 1, wherein the method employs a filling material having a contact angle of larger than 0 degrees and not larger than 12 degrees after 30 seconds from its dripping with respect to a sheet made of the same coating material as that used for an outermost layer of said dispersion compensating fiber.

7. A method of manufacturing a dispersion compensator according to claim 6, wherein a surfactant is added to the filling material.

8. A method of manufacturing a dispersion compensator according to claims 1, 4, 6, or 5, wherein the method employs a filling material having cone penetration of not less than 5 and not more than 200 in a range of not lower than −20° C. and not higher than 70° C. when a ¼ cone is used.

9. A dispersion compensator comprising a dispersion compensating fiber in the form of a coil or bundle, a housing, and a filling material, wherein said dispersion compensating fiber is placed in said housing, and a space around said dispersion compensating fiber is filled with the filling material, the filling material having a viscosity of 0.01 Pa·s to 0.6 Pa·s at normal temperature before curing.

10. A dispersion compensator according to claim 9, wherein a platinum catalyst and a curing restrainer are added in the filling material in an amount of not less than 100 ppm and in an amount of not more than 100 ppm, respectively.

11. A dispersion compensator according to claim 10, wherein the fitting material has a contact angle of larger than 0 degrees and not larger than 12 degrees after 30 seconds from its dripping with respect to a sheet made of the same coating material as that used for an outermost layer of said dispersion compensating fiber.

12. A dispersion compensator according to claim 9, wherein the filling material has a contact angle of larger than 0 degrees and not larger than 12 degrees after 30 seconds from its dripping with respect to a sheet made of the same coating material as that used for an outermost layer of said dispersion compensating fiber.

13. A dispersion compensator according to claim 12, wherein a surfactant is added in the filling material.

14. A dispersion compensator according to any one of claims 9, 10, 12, 13, wherein the filling material has a cone penetration of not less than 5 and not more than 200 in a range of not lower than −20° C. and not higher than 70° C. when a ¼ cone is used.

* * * * *